(12) United States Patent
Chatterjee et al.

(10) Patent No.: US 10,813,116 B2
(45) Date of Patent: Oct. 20, 2020

(54) SUPPORT OF ADVANCED USER EQUIPMENT (UE) MINIMUM PROCESSING TIMES IN NEW RADIO (NR) SYSTEMS

(71) Applicant: Apple Inc., Cupertino, CA (US)

(72) Inventors: Debdeep Chatterjee, San Jose, CA (US); Hong He, Sunnyvale, CA (US); Seung Hee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/407,559

(22) Filed: May 9, 2019

(65) Prior Publication Data

US 2019/0289622 A1 Sep. 19, 2019

Related U.S. Application Data

(60) Provisional application No. 62/670,650, filed on May 11, 2018.

(51) Int. Cl.
| | |
|---|---|
| *H04J 3/16* | (2006.01) |
| *H04W 72/12* | (2009.01) |
| *H04W 72/14* | (2009.01) |
| *H04L 1/18* | (2006.01) |
| *H04W 72/04* | (2009.01) |

(52) U.S. Cl.
CPC ....... *H04W 72/1278* (2013.01); *H04L 1/1812* (2013.01); *H04W 72/0446* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2019/0007942 A1* | 1/2019 | Takeda | H04W 8/22 |
| 2019/0165891 A1* | 5/2019 | Iwai | H04L 1/1861 |
| 2019/0199477 A1* | 6/2019 | Park | H04L 1/0067 |
| 2019/0254060 A1* | 8/2019 | Li | H04L 5/0055 |
| 2019/0268207 A1* | 8/2019 | Al-Imari | H04L 5/0007 |
| 2019/0289598 A1* | 9/2019 | Shimezawa | H04L 5/001 |
| 2019/0306856 A1* | 10/2019 | Ji | H04W 76/10 |

(Continued)

*Primary Examiner* — Kwang B Yao
*Assistant Examiner* — Juvena W Loo
(74) *Attorney, Agent, or Firm* — Eschweiler & Potashnik, LLC

(57) ABSTRACT

A method of support of aggressive user equipment (UE) minimum processing times for physical downlink shared channel (PDSCH) processing and physical uplink shared channel (PUSCH) preparation in new radio (NR) is disclosed. The method includes indicating or causing to indicate a capability from the UE to the network in the form of capability reporting for support of Capability 2 processing times, and multiplexing or causing to multiplex scheduling instances with Capabilities 1 or 2 based on the indication. The method also includes applying or causing to apply a relaxation to the minimum UE processing times, N1, indicating time between end of PDSCH to earliest start of corresponding hybrid automatic repeat request-acknowledge (HARQ-ACK) feedback transmission when the PDSCH has specific durations and/or mapping types or has time-domain overlaps with the scheduling physical downlink control channel (PDCCH). A corresponding apparatus and non-transitory computer readable medium are also disclosed.

21 Claims, 6 Drawing Sheets

(56) References Cited

U.S. PATENT DOCUMENTS

| | | | | |
|---|---|---|---|---|
| 2019/0306865 A1* | 10/2019 | Medles | ............... | H04L 1/1819 |
| 2019/0313386 A1* | 10/2019 | Hwang | ............ | H04W 72/0446 |
| 2019/0320431 A1* | 10/2019 | Huang | ................ | H04L 5/0053 |
| 2019/0320454 A1* | 10/2019 | Li | ...................... | H04L 1/1854 |
| 2019/0372720 A1* | 12/2019 | Lee | .................... | H04L 1/1812 |
| 2019/0372721 A1* | 12/2019 | Lee | .................... | H04L 1/1861 |
| 2020/0015256 A1* | 1/2020 | Lee | .................... | H04L 5/0055 |
| 2020/0044789 A1* | 2/2020 | Beale | ................ | H04L 25/0224 |
| 2020/0099475 A1* | 3/2020 | Amuru | ............... | H04L 1/1887 |
| 2020/0100278 A1* | 3/2020 | Li | ..................... | H04W 72/042 |
| 2020/0120668 A1* | 4/2020 | Lee | ................ | H04W 72/0446 |
| 2020/0128578 A1* | 4/2020 | Park | ................ | H04W 72/1289 |
| 2020/0136783 A1* | 4/2020 | Takeda | ............... | H04W 28/04 |

* cited by examiner

SUPPORT OF ADVANCED USER EQUIPMENT (UE) MINIMUM PROCESSING TIMES IN NEW RADIO (NR) SYSTEMS

CROSS REFERENCE TO RELATED APPLICATIONS

This application claims the benefit of priority to U.S. Provisional Patent Application No. 62/670,650, filed on May 11, 2018 which is hereby incorporated by reference in its entirety.

FIELD

Various embodiments generally may relate to the field of wireless communications.

BACKGROUND

Rel-15 NR (new radio) is expected to specify two sets of minimum UE processing times for physical downlink shared channel (PDSCH) processing and physical uplink shared channel (PUSCH) preparation. The first set of minimum processing times, referred to as Capability 1, corresponds to a "baseline" user equipment (UE) capability, that is mandatory for all NR UEs to support. The second set of minimum processing times, referred to as Capability 2, corresponds to an "aggressive" set of processing times for more advanced UEs, and expected to be supported as a UE optional feature.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
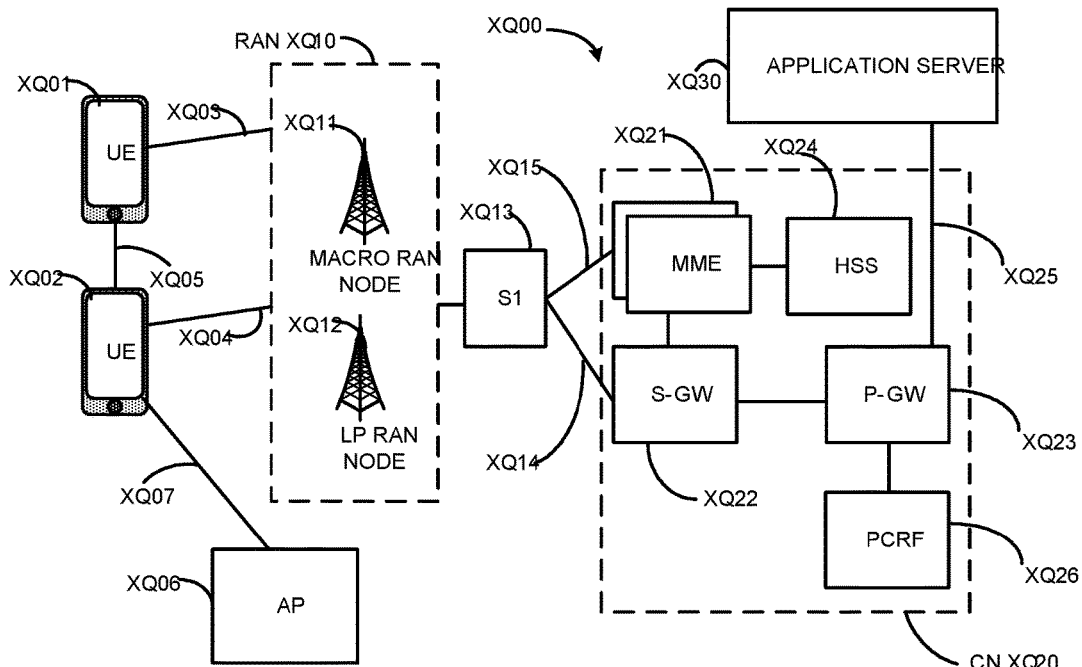
FIG. 1 illustrates an architecture of a system of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Rel-15 NR is expected to specify two sets of minimum UE processing times for PDSCH processing and PUSCH preparation. The first set of minimum processing times, referred to as Capability 1, corresponds to a "baseline" UE capability, that is mandatory for all NR UEs to support. The second set of minimum processing times, referred to as Capability 2, corresponds to an "aggressive" set of processing times for more advanced UEs, and expected to be supported as a UE optional feature.

In this regard, the following disclosure provides the related definitions related to the characterization of Capability 1 values for N1 and N2. N1: The minimum processing time in symbols of a given numerology between the end of the PDSCH and the start of the earliest possible hybrid automatic repeat request acknowledge (HARQ-ACK) transmission corresponding to the PDSCH. N2: The minimum processing time in symbols of a given numerology between the end of the physical downlink control channel (PDCCH) with the uplink (UL) grant and the start of scheduled PUSCH transmission. As quoted below, these values are the nominal values of the minimum UE processing times, with the overall PDSCH processing and PUSCH preparation times given by $T_{proc,1}$ and $T_{proc,2}$ respectively.

UE PDSCH processing procedure time (as set forth in 3GPP TS 38.214, R1-1805796, Section 5.3)

If the first uplink symbol of the physical channel which carries the HARQ-ACK information, as defined by the assigned HARQ-ACK timing $K_1$ and the PUSCH or PUCCH resource to be used and including the effect of the timing advance, starts no earlier than at symbol $L_1$ then the UE shall provide a valid HARQ-ACK message, where $L_1$ is defined as the next uplink symbol with its CP starting after $$T_{proc,1}=((N_1+d_{1,3}+d_{1,2})(2048+144)\cdot\kappa 2^{-\mu})\cdot T_c$$

after the end of the last symbol of the PDSCH carrying the TB being acknowledged.

N1 is based on µ of table 5.3-1 that corresponds to the min ($\mu_{DL}$, $\mu_{UL}$) where the $\mu_{DL}$ corresponds to the subcarrier spacing of the downlink with which the PDSCH was transmitted and $\mu_{UL}$ corresponds to the subcarrier spacing of the uplink channel with which the HARQ-ACK is to be transmitted, and κ is defined in subclause 4.41 of [4, TS 38.211, hereby incorporated by reference] If the higher layer parameter dmrs-AdditionalPosition is configured with a value greater than 0, or if the high layer parameter is not configured, then $N_1$ value follows from the second column of table 5.3-1; otherwise, the $N_1$ value follows from the first column of table 5.3-1.

If HARQ-ACK is transmitted on PUCCH, then $d_{1,1}=0$,
If HARQ-ACK is transmitted on PUSCH, then $d_{1,1}=1$.
If the UE is configured with multiple active component carriers, the first uplink symbol which carries the HARQ-ACK information further includes the effect of timing difference between the component carriers as given in [3GPP technical specification (TS) 38.133].

If the PDSCH is mapping type A as given in subclause 7.4.1.1 of [3GPP TS 38.211], and the last symbol of PDSCH is on the ith symbol of the slot where i<7, then $d_{1,2}=7-i$.

If the PDSCH is mapping type B as given in subclause 7.4.1.1 of [3GPP TS 38.211], and if the number of PDSCH symbols allocated is 4, then $d_{1,2}=3$ if the number of PDSCH symbols allocated is 2, then $d_{1,2}=3+d$, where d is the number of overlapping symbols of the scheduling PDCCH and the scheduled PDSCH.

Otherwise the UE may not provide a valid HARQ-ACK corresponding to the scheduled PDSCH. The value of $T_{proc,1}$ is used both in the case of normal and extended cyclic prefix.

TABLE 5.3-1

PDSCH processing time for PDSCH processing capability 1

| $\mu$ | PDSCH decoding time $N_1$ [symbols] | |
|---|---|---|
| | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

UE PUSCH preparation procedure time (as set forth in 3GPP TS 38.214, R1-1805796, Section 6.4)

If the first uplink symbol in the PUSCH allocation, including the DM-RS, as defined by the slot offset $K_2$ and the start and length indicator SLIV of the scheduling DCI, is no earlier than at symbol $L_2$ then the UE shall transmit PUSCH where $L_2$ is defined as the next uplink symbol with its CP starting $T_{proc,2}=((N_2+d_{2,1})(2048+144) \cdot \kappa 2^{-\mu}) \cdot T_c$ after the end of the last symbol of the PDCCH carrying the DCI scheduling the PUSCH, where $N_2$ is defined by table 6.4-1, where $N_2$ is based on $\mu$ of table 6.4-1, that corresponds to the $\min(\mu_{DL}, \mu_{UL})$ where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and $\kappa$ is defined in subclause 4.1 of [3GPP TS 38.211].

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers as given in [3GPP TS 38.133].

Otherwise the UE may ignore the scheduling DCI. The value of $T_{proc,2}$ is used both in the case of normal and extended cyclic prefix.

TABLE 6.4-1

PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

Further, the following was concluded

At least for the following conditions below, the processing times listed in Table 2 have been considered as potential candidates for specification of Capability #2, although there has been no conclusion on the final value.

Single numerology for PDCCH, PDSCH, and PUSCH and no UCI multiplexing

Case 1-1: PDCCH monitoring on up to three OFDM symbols at the beginning of a slot PDSCH allocation with at least 7 symbols is supported One unicast PDSCH received and/or one unicast PUSCH transmitted within the same slot FFS: More than one PDSCH and/or PUSCH case Single CC FFS: CA case with and without cross-carrier scheduling For C-RNTI only FFS: also applicable to the cases when C-RNTI and with other broadcast RNTIs are processed simultaneously by the UE FFS: whether Capability #2 relaxation is applied dynamically depending on conditions Note: Entities/Companies are also encouraged to provide processing times for 60 kHz (FR1)

Note: Entities/Companies are also encouraged to provide conditions under which more aggressive processing times (within the range) could be enabled

TABLE 2

UE Processing Times for Capability #2

| Configuration | HARQ Timing Parameter | Units | 15 KHz SCS | 30 KHz SCS |
|---|---|---|---|---|
| Front-loaded DMRS only | N1 | Symbols | [2.5-4] | [2.5-6] |
| Frequency-first RE-mapping | N2[1] | Symbols | [2.5-6] | [2.5-6] |

[1]If 1st symbol of PUSCH is data-only or FDM data with DMRS, then add 1 symbol to N2 in table.

As can be seen from the above, additional conditions may be defined for the case of Capability 2 in order to increase the feasibility of supporting very tight processing times for typical use cases that are expected to benefit from very low round-trip-time (RTT) values. In this regard, restrictions related to max scheduled bandwidth (BW), max transport block size (TBS), max number of layers, max number of component carriers (CCs) may be considered.

However, many of these restrictions imply that, depending on the scheduling decision, for a UE supporting Capability 2 processing times for the concerned configuration, the UE may expect HARQ-ACK or PUSCH time-lines that satisfies Capability 2 or Capability 1. This could be changing dynamically across consecutive scheduling instances, thereby adversely impacting the UE pipelining. Here, it is noted that a pipelined architecture is anticipated as means to enable cost- and power-efficient UE implementations while satisfying very challenging processing times and loads. The adverse impact to UE pipelining can be seen using the following example.

Assume for a given SCS, Capability 2 applies for N1 values only when the scheduled BW is limited to a certain max value (BW_max). Then, in case the UE is scheduled with BW>BW_max and Capability 1 applies, followed by a scheduling instance with BW<BW_max and Capability 2 applies, then the processing time corresponding to the first PDSCH may overlap with the processing of the second PDSCH, thereby impacting the pipelining.

In this disclosure, we present system and methods for the support of Capability 2 UE processing times in NR. Specifically, the following are addressed in this disclosure:
Applicability of Capability 2 and definition and signaling of UE capability reporting for Capability 2
Handling of back-to-back scheduling with different processing times
Details of Capability 2 characterization for specific channel durations and configurations including handling of short PDSCH durations Applicability of Capability 2 and Definition and Signaling of UE Capability Reporting for Capability 2

Support of UE minimum processing times based on Capability 2 is expected to be defined as an optional UE capability. To facilitate efficient UE implementation considering the target use cases and to increase the feasibility of very tight processing times, one option is to limit the application of Capability 2 to non-CA configurations. Consequently, in an embodiment, the UE may be expected to support Capability 2 only when it is configured with single carrier operation, and expects HARQ-ACK and PUSCH timings to satisfy Capability 1 N1, N2 values when configured with CA.

Alternatively, for a UE indicating support of Capability 2, in case CA is configured to the UE, the UE is configured with a single or subset of configured DL and/or UL component carriers (CCs) for which Capability 2 may apply. Thus, for each of the single or a subset of DL or UL serving cells respectively, the UE can be configured via UE-specific RRC signaling whether or not Capability 2-based timing is enabled. For the other CCs, the UE can expect that HARQ-ACK and PUSCH transmission timings satisfy Capability 1.

As another alternative, the UE may indicate its capability on a per-CC (and per-UE) basis. In an example, the UE can indicate if it can support Capability 2 processing times for one or multiple of component carriers.

For the above cases, wherein Capability 2 is limited to a single or a subset of configured DL/UL CCs, at least for N1 value determination, the capability is limited to the case of self-carrier scheduling only and Capability 1 applies to cross-carrier scheduling. Alternatively, Capability 2 is defined based on the scheduled CC and in that case, may be applicable to both cases: self-carrier or cross-carrier scheduling. Note that for the case of cross-carrier scheduling, a HARQ-ACK and PUSCH timings should take into account any timing offsets between the component carriers similar to the definition for Capability 1.

Further, in an embodiment, Capability 2 may be applicable only when the UE is scheduled with a BW of less than X MHz for a given SCS value. In an example, X=50 MHz for 15 kHz SCS, and X=100 MHz for 30 kHz SCS, etc. Alternatively, it the BW restriction may be defined in terms of a maximum number of PRBs.

Handling of Back-to-Back Scheduling with Different Processing Times

As described in the Introduction section, whether a PDSCH or an UL grant is subject to Capability 2 or 1 may depend on scheduling decision, and thus, change dynamically. This can adversely impact the pipelined processing in the UE processing chain (Rx or Tx chains).

To address this issue, in an embodiment, the UE may be allowed to drop the processing of a number of PDSCHs that may be scheduled to follow Capability 1 such that they are scheduled within a window 'W_N1' before the start of a PDSCH that is scheduled to follow Capability 2. The window 'W_N1' can be defined in units of OFDM symbols as: W_N1 can be a value from one of: $\{1, 2, \ldots, N1\_cap1\}$ where N1_cap1 corresponds to the N1 value defined for the given SCS value for Capability 1. In a further example, the value of W_N1 may be indicated by the UE to the network as a UE capability.

Similarly, for PUSCH preparation time and transmission, in an embodiment, the UE may be allowed to drop the processing and transmission of a number of PUSCHs that may be scheduled to follow Capability 1 such that they are scheduled within a window 'W_N2' before the start of a PDCCH that carries an UL grant to schedule a PUSCH following Capability 2. The window 'W_N2' can be defined in units of OFDM symbols as: W_N2 can be a value from one of: $\{1, 2, \ldots, N2\_cap1\}$ where N2_cap1 corresponds to the N2 value defined for the given SCS value for Capability 1. In a further example, the value of W_N2 may be indicated by the UE to the network as a UE capability.

Further, in an embodiment, W_N1 and W_N2 are separately indicated as UE capabilities to the network for addressing dynamic switching between Capabilities 1 and 2 for PDSCH and PUSCH processing times respectively.

In yet another embodiment, the window W_N1 is defined as W_N1 as a value from one of: $\{1, 2, \ldots, N1'\_cap1\}$, where N1'_cap1=N1_cap1+m_N1, where m_N1 may be specified with a value of 1, 2, 3, 4, or 5. This takes into account special cases wherein additional margins to handle special cases as defined in the characterization of Capability 1, e.g., PDSCH mapping types A or B with short durations, HARQ-ACK transmission using PUSCH instead of PUCCH, etc. In other words, m_N1 can be defined as m_N1=max $(d_{1,1}+d_{1,2})$ where the max ( ) is over all valid combinations of $d_{1,1}$ and $d_{1,2}$ values.

Similarly, in an embodiment, the window W_N2 is defined as W_N2 as a value from one of: $\{1, 2, \ldots, N2'\_cap1\}$, where N2'_cap1=N2_cap1+m_N2, where m_N2 may be specified as m_N2=1. This takes into account special cases wherein additional margin of 1 symbol to handle the special case when the allocated PUSCH has data mapped on to the first PUSCH symbol. In other words, m_N2 can be defined as m_N2=max $d_{2,1}$=1.

In another embodiment, dynamic switching between Capabilities 1 and 2 is avoided by specifying that the corresponding scheduling restriction that if a UE is configured to follow Capability 2 for a CC, then, the UE does not expect scheduling decision such that Capability 2 does not apply.

Capability 2 Characterization for Specific Channel Durations and Configurations including Handling of Short PDSCH Durations In this sub-section, we present details of handling of some special cases for Capability 2 N1 values as detailed below.

For PDSCH mapping type A with last PDSCH symbol ending in symbol 'i' of a slot, where i<7, similar to Capability 1, (7−i) symbols are added to the N1 value for Capability 2 for this case.

For PDSCH mapping type B with 7 symbols, similar to Capability 1, the same N1 value as is defined as for PDSCH mapping type A with >=7 symbols may apply.

For PDSCH mapping type B with 4 symbols, in one embodiment, similar to Capability 1, 3 symbols are added to the N1 value, where N1 value is defined as for PDSCH mapping type A with >=7 symbols.

Considering the low latency target use cases and advanced UE processing capability, always incurring a 3-symbol additional processing time penalty may significantly undermine the benefit of Capability 2 for short PDSCH durations. Thus, in another embodiment, for PDSCH mapping type B with 4 symbols, for Capability 2, 'd' symbols are added to the N1 value, where N1 value is defined as for PDSCH mapping type A with >=7 symbols and 'd' is the amount of time-domain overlap in symbols between the scheduling PDCCH and the scheduled PDSCH (Note: this approach was disclosed in PCT published application WO/2019/005560, which is hereby incorporated by reference in its entirety.).

For PDSCH mapping type B with 2 symbols, in an embodiment, similar to Capability 1, (3+d) symbols are added to the N1 value, where N1 value is defined as for PDSCH mapping type A with >=7 symbols, and 'd' corresponds to the amount of time-domain overlap in symbols between the scheduling PDCCH and the scheduled PDSCH.

In another embodiment, for PDSCH mapping type B with 2 symbols, for Capability 2, 'd' symbols are added to the N1 value, where N1 value is defined as for PDSCH mapping type A with >=7 symbols and 'd' is the amount of time-domain overlap in symbols between the scheduling PDCCH and the scheduled PDSCH.

In a further embodiment, for PDSCH mapping type B with 2 symbols, for Capability 2, 'd' symbols are added to the N1 value, where N1 value is defined as for PDSCH mapping type A with >=7 symbols and 'd' is defined as:

If the scheduling PDCCH and scheduled PDSCH have same starting symbol, d=CORESET_duration, where CORESET_duration corresponds to the duration of the CORESET that is used to map the scheduling PDCCH with CORESET_duration={1, 2, 3}

If the scheduling PDCCH starts at least one symbol before the scheduled PDSCH,

'd' is the amount of time-domain overlap in symbols between the scheduling PDCCH and the scheduled PDSCH. Note that, since the PDCCH CORESET may of durations from one of {1, 2, 3} symbols and a scheduled PDSCH may not start before the first symbol of the scheduling PDCCH, this above characterization is equivalent to the following alternative characterization:

If the scheduling PDCCH is mapped to a CORESET with CORESET_duration=3 symbols, and the scheduling PDCCH and scheduled PDSCH have the same starting symbol, d=CORESET_duration=3 symbols;

Otherwise,

'd' is the amount of time-domain overlap in symbols between the scheduling PDCCH and the scheduled PDSCH FIG. 1 illustrates an architecture of a system XQ00 of a network in accordance with some embodiments. The system XQ00 is shown to include a user equipment (UE) XQ01 and a UE XQ02. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs XQ01 and XQ02 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs XQ01 and XQ02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XQ01 and XQ02 may be configured to connect, e.g., communicatively couple, with a radio access network (RAN) XQ10. The RAN XQ10 may be, for example, an Evolved Universal Mobile Telecommunications System (UMTS) Terrestrial Radio Access Network (E-UTRAN), a NextGen RAN (NG RAN), or some other type of RAN. The UEs XQ01 and XQ02 utilize connections (or channels) XQ03 and XQ04, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections XQ03 and XQ04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XQ01 and XQ02 may further directly exchange communication data via a ProSe interface XQ05. The ProSe interface XQ05 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface XQ05 may be used in vehicular applications and communications technologies, which are often referred to as V2X systems. V2X is a mode of communication where UEs (for example, UEs XQ01, XQ02) communicate with each other directly over the PC5/SL interface XQ05 and can take place when the UEs XQ01, XQ02 are served by RAN nodes XQ11, XQ12 or when one or more UEs are outside a coverage area of the RAN XQ10. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) XQ01, XQ02, RAN nodes XQ11, XQ12, application servers XQ30, and pedestrian UEs XQ01, XQ02 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs XQ01, XQ02 may be implemented/employed as Vehicle Embedded Communications Systems (VECS) or vUEs.

The UE XQ02 is shown to be configured to access an access point (AP) XQ06 (also referred to as "WLAN node XQ06", "WLAN XQ06", "WLAN Termination XQ06" or "WT XQ06" or the like) via connection XQ07. The connection XQ07 can comprise a local wireless connection, such as a connection consistent with any IEEE 802.11 protocol, wherein the AP XQ06 would comprise a wireless fidelity (WiFi®) router. In this example, the AP XQ06 is shown to be connected to the Internet without connecting to the core network of the wireless system (described in further detail below). In various embodiments, the UE XQ02, RAN XQ10, and AP XQ06 may be configured to utilize LTE-WLAN aggregation (LWA) operation and/or WLAN LTE/WLAN Radio Level Integration with IPsec Tunnel (LWIP) operation. The LWA operation may involve the UE XQ02 in RRC_CONNECTED being configured by a RAN node XQ11, XQ12 to utilize radio resources of LTE and WLAN. LWIP operation may involve the UE XQ02 using WLAN radio resources (e.g., connection XQ07) via Internet Protocol Security (IPsec) protocol tunneling to authenticate and encrypt packets (e.g., internet protocol (IP) packets) sent over the connection XQ07. IPsec tunneling may include encapsulating entirety of original IP packets and adding a new packet header, thereby protecting the original header of the IP packets.

The RAN XQ10 can include one or more access nodes that enable the connections XQ03 and XQ04. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN XQ10 may include one or more RAN nodes for providing macrocells, e.g., macro RAN node XQ11, and one or more RAN nodes for providing femtocells or picocells (e.g., cells having smaller coverage areas, smaller user capacity, or higher bandwidth compared to macrocells), e.g., low power (LP) RAN node XQ12.

Any of the RAN nodes XQ11 and XQ12 can terminate the air interface protocol and can be the first point of contact for the UEs XQ01 and XQ02. In some embodiments, any of the RAN nodes XQ11 and XQ12 can fulfill various logical functions for the RAN XQ10 including, but not limited to, radio network controller (RNC) functions such as radio bearer management, uplink and downlink dynamic radio resource management and data packet scheduling, and mobility management.

In accordance with some embodiments, the UEs XQ01 and XQ02 can be configured to communicate using Orthogonal Frequency-Division Multiplexing (OFDM) communication signals with each other or with any of the RAN nodes XQ11 and XQ12 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XQ11 and XQ12 to the UEs XQ01 and XQ02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs XQ01 and XQ02. The physical downlink control channel (PDCCH) may carry information about the transport format and resource allocations related to the PDSCH channel, among other things. It may also inform the UEs XQ01 and XQ02 about the transport format, resource allocation, and H-ARQ (Hybrid Automatic Repeat Request) information related to the uplink shared channel. Typically, downlink scheduling (assigning control and shared channel resource blocks to the UE XQ02 within a cell) may be performed at any of the RAN nodes XQ11 and XQ12 based on channel quality information fed back from any of the UEs XQ01 and XQ02. The downlink resource assignment information may be sent on the PDCCH used for (e.g., assigned to) each of the UEs XQ01 and XQ02.

The PDCCH may use control channel elements (CCEs) to convey the control information. Each PDCCH may be transmitted using one or more of these CCEs, where each CCE may correspond to six sets of nine physical resource elements and 3 demodulation reference signals (DMRS), the combination known as resource element groups (REGs). Nine Quadrature Phase Shift Keying (QPSK) symbols may be mapped to each REG. The PDCCH can be transmitted using one or more CCEs, depending on the size of the downlink control information (DCI) and the channel condition. There can be five different choices of numbers of CCEs that may be used to map a PDCCH in NR, corresponding to aggregation levels L=1, 2, 4, 8, or 16.

The RAN XQ10 is shown to be communicatively coupled to a core network (CN) XQ20 via an S1 interface XQ13. In embodiments, the CN XQ20 may be an evolved packet core (EPC) network, a NextGen Packet Core (NPC) network, or some other type of CN. In this embodiment the S1 interface XQ13 is split into two parts: the S1-U interface XQ14, which carries traffic data between the RAN nodes XQ11 and XQ12 and the serving gateway (S-GW) XQ22, and the S1-mobility management entity (MME) interface XQ15, which is a signaling interface between the RAN nodes XQ11 and XQ12 and MMEs XQ21.

In this embodiment, the CN XQ20 comprises the MMEs XQ21, the S-GW XQ22, the Packet Data Network (PDN) Gateway (P-GW) XQ23, and a home subscriber server (HSS) XQ24. The MMEs XQ21 may be similar in function to the control plane of legacy Serving General Packet Radio Service (GPRS) Support Nodes (SGSN). The MMEs XQ21 may manage mobility aspects in access such as gateway selection and tracking area list management. The HSS XQ24 may comprise a database for network users, including subscription-related information to support the network entities' handling of communication sessions. The CN XQ20 may comprise one or several HSSs XQ24, depending on the number of mobile subscribers, on the capacity of the equipment, on the organization of the network, etc. For example, the HSS XQ24 can provide support for routing/roaming, authentication, authorization, naming/addressing resolution, location dependencies, etc.

The S-GW XQ22 may terminate the S1 interface XQ13 towards the RAN XQ10, and routes data packets between the RAN XQ10 and the CN XQ20. In addition, the S-GW XQ22 may be a local mobility anchor point for inter-RAN node handovers and also may provide an anchor for inter-3GPP mobility. Other responsibilities may include lawful intercept, charging, and some policy enforcement.

The P-GW XQ23 may terminate an SGi interface toward a PDN. The P-GW XQ23 may route data packets between the EPC network XQ20 and external networks such as a network including the application server XQ30 (alternatively referred to as application function (AF)) via an Internet Protocol (IP) interface XQ25. Generally, the application server XQ30 may be an element offering applications that use IP bearer resources with the core network (e.g., UMTS Packet Services (PS) domain, LTE PS data services, etc.). In this embodiment, the P-GW XQ23 is shown to be communicatively coupled to an application server XQ30 via an IP communications interface XQ25. The application server XQ30 can also be configured to support one or more communication services (e.g., Voice-over-Internet Protocol (VoIP) sessions, PTT sessions, group communication sessions, social networking services, etc.) for the UEs XQ01 and XQ02 via the CN XQ20.

The P-GW XQ23 may further be a node for policy enforcement and charging data collection. Policy and Charging Rules Function (PCRF) XQ26 is the policy and charging control element of the CN XQ20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF XQ26 may be communicatively coupled to the application server XQ30 via the P-GW XQ23. The application server XQ30 may signal the PCRF XQ26 to indicate a new service flow and select the appropriate Quality of Service (QoS) and charging parameters. The PCRF XQ26 may provision this rule into a Policy and Charging Enforcement Function (PCEF) (not shown) with the appropriate traffic flow template (TFT) and QoS class of identifier (QCI), which commences the QoS and charging as specified by the application server XQ30.

Figure 2:
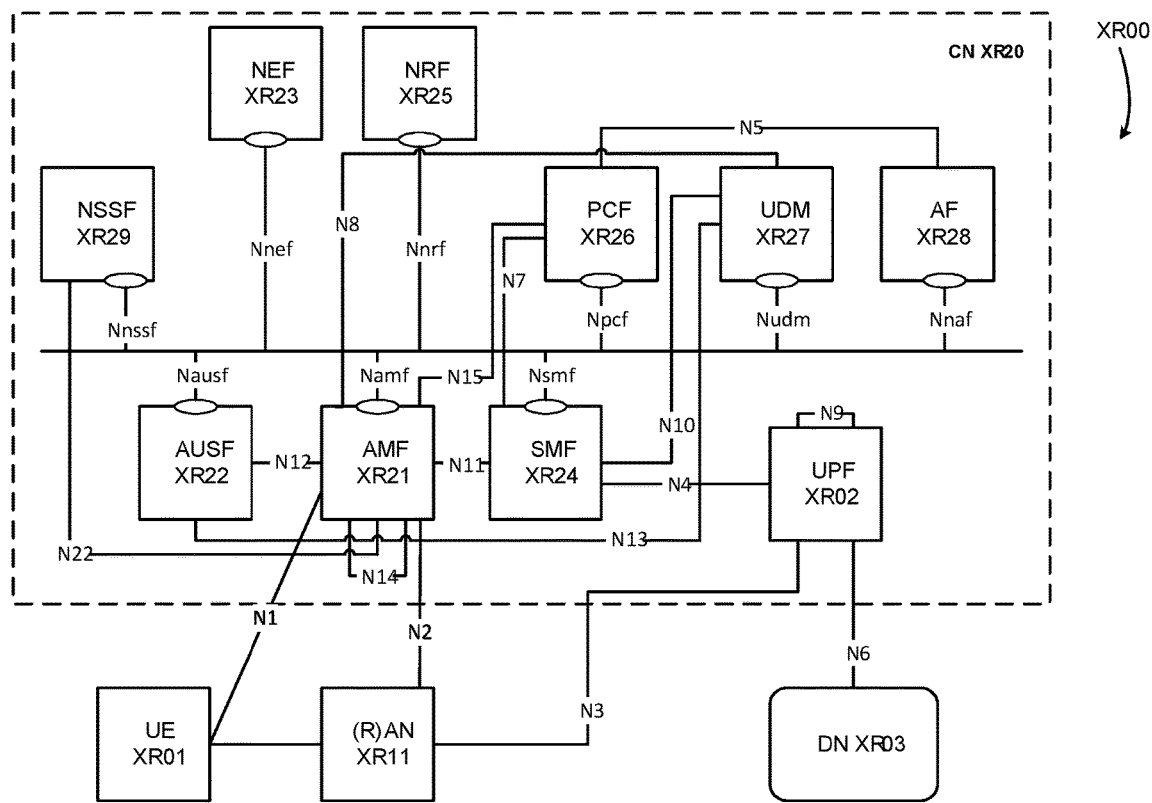
FIG. 2 illustrates an architecture of a system of a network in accordance with some embodiments.

FIG. 2 illustrates an architecture of a system XR00 of a network in accordance with some embodiments. The system XR00 is shown to include a UE XR01, which may be the same or similar to UEs XQ01 and XQ02 discussed previously; a RAN node XR11, which may be the same or similar to RAN nodes XQ11 and XQ12 discussed previously; a Data Network (DN) XR03, which may be, for example, operator services, Internet access or 3rd party services; and a 5G Core Network (5GC or CN) XR20.

The CN XR20 may include an Authentication Server Function (AUSF) XR22; an Access and Mobility Management Function (AMF) XR21; a Session Management Function (SMF) XR24; a Network Exposure Function (NEF) XR23; a Policy Control Function (PCF) XR26; a Network Function (NF) Repository Function (NRF) XR25; a Unified Data Management (UDM) XR27; an Application Function (AF) XR28; a User Plane Function (UPF) XR02; and a Network Slice Selection Function (NSSF) XR29.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, perform packet inspection, enforce user plane part of policy rules, lawfully intercept packets (UP collection), traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. DN XR03 may include, or be similar to, application server XQ30 discussed previously. The UPF XR02 may interact with the SMF XR24 via an N4 reference point between the SMF XR24 and the UPF XR02.

The AUSF XR22 may store data for authentication of UE XR01 and handle authentication related functionality. The AUSF XR22 may facilitate a common authentication framework for various access types. The AUSF XR22 may communicate with the AMF XR21 via an N12 reference point between the AMF XR21 and the AUSF XR22; and may communicate with the UDM XR27 via an N13 reference point between the UDM XR27 and the AUSF XR22. Additionally, the AUSF XR22 may exhibit an Nausf service-based interface.

The AMF XR21 may be responsible for registration management (e.g., for registering UE XR01, etc.), connection management, reachability management, mobility management, and lawful interception of AMF-related events, and access authentication and authorization. The AMF XR21 may be a termination point for an N11 reference point between the AMF XR21 and the SMF XR24. The AMF XR21 may provide transport for Session Management (SM) messages between the UE XR01 and the SMF XR24, and act as a transparent proxy for routing SM messages. AMF XR21 may also provide transport for short message service (SMS) messages between UE XR01 and an SMS function (SMSF) (not shown by FIG. 2). AMF XR21 may act as Security Anchor Function (SEAF), which may include interaction with the AUSF XR22 and the UE XR01, as well as receipt of an intermediate key that was established as a result of the UE XR01 authentication process. Where UMTS Subscriber Identity Module (USIM) based authentication is used, the AMF XR21 may retrieve the security material from the AUSF XR22. AMF XR21 may also include a Security Context Management (SCM) function, which receives a key from the SEAF that it uses to derive access-network specific keys. Furthermore, AMF XR21 may be a termination point of RAN CP interface, which may include or be an N2 reference point between the (R)AN XR11 and the AMF XR21; and the AMF XR21 may be a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N3IWF may be a termination point for the N2 interface between the (R)AN XR11 and the AMF XR21 for the control plane, and may be a termination point for the N3 reference point between the (R)AN XR11 and the UPF XR02 for the user plane. As such, the AMF XR21 may handle N2 signalling from the SMF XR24 and the AMF XR21 for PDU sessions and QoS, encapsulate/de-encapsulate packets for IPSec and N3 tunneling, mark N3 user-plane packets in the uplink, and enforce QoS corresponding to N3 packet marking, which may take into account QoS requirements associated to such marking received over N2. N3IWF may also relay uplink and downlink control-plane NAS signalling between the UE XR01 and AMF XR21 via an N1 reference point between the UE XR01 and the AMF XR21, and relay uplink and downlink user-plane packets between the UE XR01 and UPF XR02. The N3IWF also provides mechanisms for IPsec tunnel establishment with the UE XR01. The AMF XR21 may exhibit an Namf service-based interface, and may be a termination point for an N14 reference point between two AMFs XR21 and an N17 reference point between the AMF XR21 and a 5G-Equipment Identity Register (5G-EIR) (not shown by FIG. 2).

The SMF XR24 may be responsible for session management (e.g., session establishment, modify and release, including tunnel maintain between UPF and AN node). The SMF XR24 may also allocate and manage UE IP addresses (including optional authorization), select and control UP functions, and configures traffic steering at the UPF XR02 to route traffic to a proper destination. The SMF XR24 may also terminate interfaces towards Policy Control Functions, control part of policy enforcement and QoS, and perform lawful interception (e.g., for SM events and interface to LI system). The SMF XR24 may also terminate SM parts of NAS messages, provide downlink data notification, and initiate AN specific SM information, sent via AMF over N2 to AN, and determine Session and Service Continuity (SSC) mode of a session.

The SMF XR24 may include the following roaming functionality: handle local enforcement to apply QoS SLAs (VPLMN); charging data collection and charging interface (VPLMN); lawful intercept (in VPLMN for SM events and interface to LI System); and support for interaction with external DN for transport of signalling for PDU session authorization/authentication by external DN. An N16 reference point between two SMFs XR24 may be included in the system XR00, which may be between another SMF XR24 in a visited network and the SMF XR24 in the home network in roaming scenarios. Additionally, the SMF XR24 may exhibit the Nsmf service-based interface.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using standardized interfaces. The stored information can then be re-exposed by the NEF XR23 to other NFs and AFs, and/or used for other purposes such as analytics. Additionally, the NEF XR23 may exhibit an Nnef service-based interface.

The NRF XR25 may support service discovery functions, receive NF Discovery Requests from NF instances, and provide the information of the discovered NF instances to the NF instances. NRF XR25 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF XR25 may exhibit the Nnrf service-based interface.

The PCF XR26 may provide policy rules to control plane function(s) to enforce them, and may also support unified policy framework to govern network behavior. The PCF XR26 may also implement a front end (FE) to access subscription information relevant for policy decisions in a Unified Data Repository (UDR) of the UDM XR27. The PCF XR26 may communicate with the AMF XR21 via an N15 reference point between the PCF XR26 and the AMF XR21, which may include a PCF XR26 in a visited network and the AMF XR21 in case of roaming scenarios. The PCF XR26 may communicate with the AF XR28 via an N5 reference point between the PCF XR26 and the AF XR28; and with the SMF XR24 via an N7 reference point between the PCF XR26 and the SMF XR24. The system XR00 and/or CN XR20 may also include an N24 reference point between the PCF XR26 (in the home network) and a PCF XR26 in a visited network. Additionally, the PCF XR26 may exhibit an Npcf service-based interface.

The UDM XR27 may handle subscription-related information to support the network entities' handling of communication sessions, and may store subscription data of UE XR01. For example, subscription data may be communicated between the UDM XR27 and the AMF XR21 via an N8 reference point between the UDM XR27 and the AMF XR21 (not shown by FIG. 2). The UDM XR27 may include two parts, an application FE and a User Data Repository (UDR) (the FE and UDR are not shown by FIG. 2). The UDR may store subscription data and policy data for the UDM XR27 and the PCF XR26, and/or structured data for exposure and application data (including Packet Flow Descriptions (PFDs) for application detection, application request information for multiple UEs XR01) for the NEF XR23. The Nudr service-based interface may be exhibited by the UDR to allow the UDM XR27, PCF XR26, and NEF XR23 to access a particular set of the stored data, as well as to read, update (e.g., add, modify), delete, and subscribe to notification of relevant data changes in the UDR. The UDM XR27 may include a UDM FE, which is in charge of processing credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF XR24 via an N10 reference point between the UDM XR27 and the SMF XR24. UDM XR27 may also support SMS management, wherein an SMS-FE implements the similar application logic as discussed previously. Additionally, the UDM XR27 may exhibit the Nudm service-based interface.

The AF XR28 may provide application influence on traffic routing, provide access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs. Additionally, the AF XR28 may exhibit an Naf service-based interface.

The NSSF XR29 may select a set of network slice instances serving the UE XR01. The NSSF XR29 may also determine allowed Network Slice Selection Assistance Information (NSSAI) and the mapping to the Subscribed Single-NSSAIs (S-NSSAIs), if needed. The NSSF XR29 may also determine the AMF set to be used to serve the UE XR01, or a list of candidate AMF(s) XR21 based on a suitable configuration and possibly by querying the NRF XR25. The selection of a set of network slice instances for the UE XR01 may be triggered by the AMF XR21 with which the UE XR01 is registered by interacting with the NSSF XR29, which may lead to a change of AMF XR21. The NSSF XR29 may interact with the AMF XR21 via an N22 reference point between AMF XR21 and NSSF XR29; and may communicate with another NSSF XR29 in a visited network via an N31 reference point (not shown by FIG. 2). Additionally, the NSSF XR29 may exhibit an Nnssf service-based interface.

As discussed previously, the CN XR20 may include an SMSF, which may be responsible for SMS subscription checking and verification, and relaying SM messages to/from the UE XR01 to/from other entities, such as an Short Message Service (SMS)-Global Systems for Mobile Communication (GMSC)/Inter-Working Mobile Switching Center (IWMSC)/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The CN XR20 may also include other elements that are not shown by FIG. 2, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN XR20 may include an Nx interface, which is an inter-CN interface between the MME (e.g., MME XQ21) and the AMF XR21 in order to enable interworking between CN XR20 and CN XQ20. Other example interfaces/reference points may include an N5g-EIR service-based interface exhibited by a 5G-EIR, an N27 reference point between an NRF in the visited network and the NRF in the home network; and an N31 reference point between the NSSF in the visited network and the NSSF in the home network.

In yet another example, system XR00 may include multiple RAN nodes XR11 wherein an Xn interface is defined between two or more RAN nodes XR11 (e.g., gNBs and the like) connecting to 5GC XR20, between a RAN node XR11 (e.g., gNB) connecting to 5GC XR20 and an eNB (e.g., a RAN node XQ11 of FIG. XQ), and/or between two eNBs connecting to 5GC XR20. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; and mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 3:
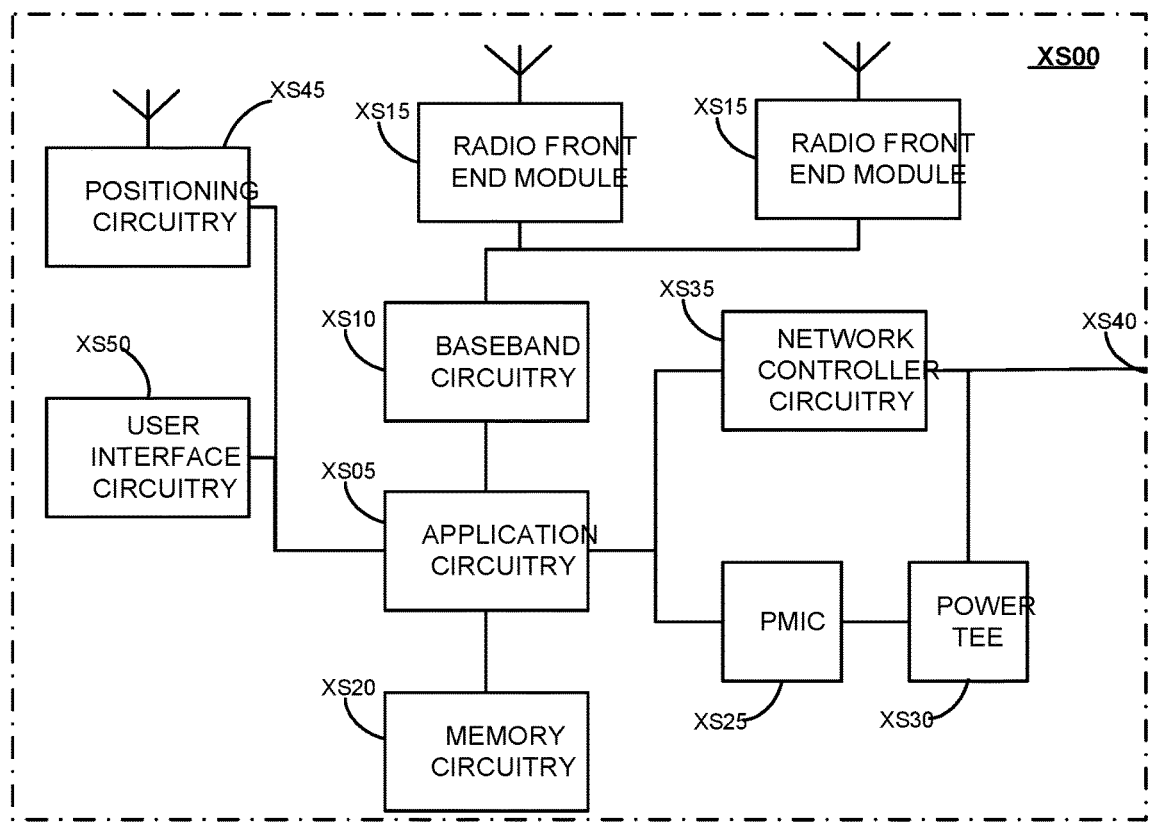
FIG. 3 illustrates an example of infrastructure equipment in accordance with various embodiments.

FIG. 3 illustrates an example of infrastructure equipment XS00 in accordance with various embodiments. The infrastructure equipment XS00 (or "system XS00") may be implemented as a base station, radio head, RAN node, etc., such as the RAN nodes XQ11 and XQ12, and/or AP XQ06 shown and described previously. In other examples, the system XS00 could be implemented in or by a UE, application server(s) XQ30, and/or any other element/device discussed herein. The system XS00 may include one or more of application circuitry XS05, baseband circuitry XS10, one or more radio front end modules XS15, memory XS20, power management integrated circuitry (PMIC) XS25, power tee circuitry XS30, network controller XS35, network interface connector XS40, satellite positioning circuitry XS45, and user interface XS50. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network XQ20 (or CN XR20 discussed previously) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry XS05 may include one or more central processing unit (CPU) cores and one or more of cache memory, low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry XS05 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system XS00 may not utilize application circuitry XS05, and instead may include a special-purpose processor/controller to process IP data received from an EPC or 5GC, for example.

Additionally or alternatively, application circuitry XS05 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XS05 may comprise logic blocks or logic fabric including other interconnected resources that may be programmed to perform various functions, such as the procedures, methods, functions, etc. of the various embodiments discussed herein. In such embodiments, the circuitry of application circuitry XS05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XS10 may be implemented, for example, as a solder-down substrate including one or more integrated circuits, a single packaged integrated circuit soldered to a main circuit board or a multi-chip module containing two or more integrated circuits. Although not shown, baseband circuitry XS10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XS10 may include protocol processing circuitry with one or more instances of control circuitry (not shown) to provide control functions for the digital baseband circuitry and/or radio frequency circuitry (for example, the radio front end modules XS15).

User interface circuitry XS50 may include one or more user interfaces designed to enable user interaction with the system XS00 or peripheral component interfaces designed to enable peripheral component interaction with the system XS00. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XS20 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry XS20 may be implemented as one or more of solder down packaged integrated circuits, socketed memory modules and plug-in memory cards.

The PMIC XS25 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry XS30 may provide for electrical power drawn from a network cable to provide both power supply and data connectivity to the infrastructure equipment XS00 using a single cable.

The network controller circuitry XS35 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment XS00 via network interface connector XS40 using a physical connection, which may be electrical (commonly referred to as a "copper interconnect"), optical, or wireless. The network controller circuitry XS35 may include one or more dedicated processors and/or FPGAs to communicate using one or more of the aforementioned protocol. In some implementations, the network controller circuitry XS35 may include multiple controllers to provide connectivity to other networks using the same or different protocols.

The positioning circuitry XS45 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry XS45 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry XS45 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry XS45 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry XS45 may provide data to application circuitry XS05, which may include one or more of position data or time data. Application circuitry XS05 may use the time data to synchronize operations with other radio base stations (e.g., RAN nodes XQ11, XQ12, XR11 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 4:
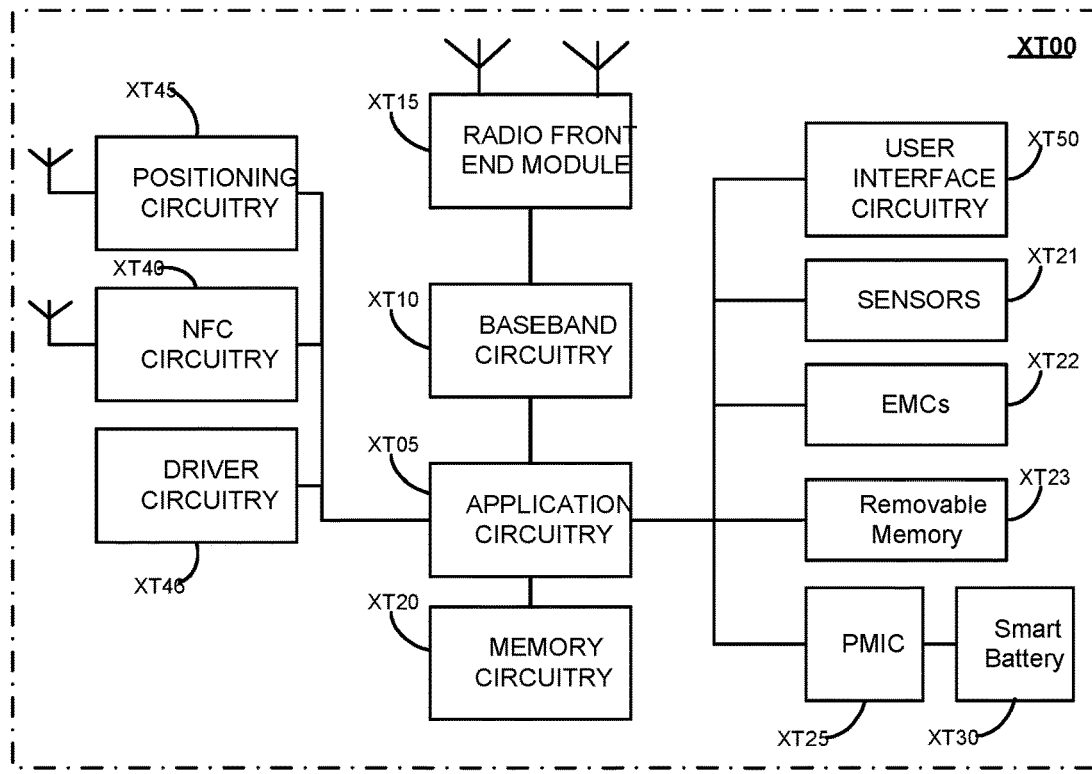
FIG. 4 illustrates an example of a platform (or "device") in accordance with various embodiments.

FIG. 4 illustrates an example of a platform XT00 (or "device XT00") in accordance with various embodiments. In embodiments, the computer platform XT00 may be suitable for use as UEs XQ01, XQ02, XR01, application servers XQ30, and/or any other element/device discussed herein. The platform XT00 may include any combinations of the components shown in the example. The components of platform XT00 may be implemented as integrated circuits (ICs), portions thereof, discrete electronic devices, or other modules, logic, hardware, software, firmware, or a combination thereof adapted in the computer platform XT00, or as components otherwise incorporated within a chassis of a larger system. The block diagram of FIG. 4 is intended to show a high level view of components of the computer platform XT00. However, some of the components shown may be omitted, additional components may be present, and different arrangement of the components shown may occur in other implementations.

The application circuitry XT05 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform XT00. In some embodiments, processors of application circuitry XS05/XT05 may process IP data packets received from an EPC or 5GC.

Application circuitry XT05 may be or may include a microprocessor, a multi-core processor, a multithreaded processor, an ultra-low voltage processor, an embedded processor, or other known processing element. In one example, the application circuitry XT05 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry XT05 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry XT05 may be a part of a system on a chip (SoC) in which the application circuitry XT05 and other components are formed into a single integrated circuit, or a single package, such as the Edison™ or Galileo™ SoC boards from Intel® Corporation.

Additionally or alternatively, application circuitry XT05 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XT05 may comprise logic blocks or logic fabric including other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XT10 may be implemented, for example, as a solder-down substrate including one or more integrated circuits, a single packaged integrated circuit soldered to a main circuit board or a multi-chip module containing two or more integrated circuits. Although not shown, baseband circuitry XT10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XT10 may include protocol processing circuitry with one or more instances of control circuitry (not shown) to provide control functions for the digital baseband circuitry and/or radio frequency circuitry (for example, the radio front end modules XT15).

The radio front end modules (RFEMs) XT15 may comprise a millimeter wave RFEM and one or more sub-millimeter wave radio frequency integrated circuits (RFICs).

In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XT15. The RFEMs XT15 may incorporate both millimeter wave antennas and sub-millimeter wave antennas.

The memory circuitry XT20 may include any number and type of memory devices used to provide for a given amount of system memory. As examples, the memory circuitry XT20 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry XT20 may be developed in accordance with a Joint Electron Devices Engineering Council (JEDEC) low power double data rate (LPDDR)-based design, such as LPDDR2, LPDDR3, LPDDR4, or the like. Memory circuitry XT20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry XT20 may be on-die memory or registers associated with the application circuitry XT05. To provide for persistent storage of information such as data, applications, operating systems and so forth, memory circuitry XT20 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform XT00 may incorporate the three-dimensional (3D) cross-point (XPOINT) memories from Intel® and Micron®.

Removable memory circuitry XT23 may include devices, circuitry, enclosures/housings, ports or receptacles, etc. used to coupled portable data storage devices with the platform XT00. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform XT00 may also include interface circuitry (not shown) that is used to connect external devices with the platform XT00. The external devices connected to the platform XT00 via the interface circuitry may include sensors XT21, such as accelerometers, level sensors, flow sensors, temperature sensors, pressure sensors, barometric pressure sensors, and the like. The interface circuitry may be used to connect the platform XT00 to electro-mechanical components (EMCs) XT22, which may allow platform XT00 to change its state, position, and/or orientation, or move or control a mechanism or system. The EMCs XT22 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform XT00 may be configured to operate one or more EMCs XT22 based on one or more captured events and/or instructions or control signals received from a service provider and/or various clients.

In some implementations, the interface circuitry may connect the platform XT00 with positioning circuitry XT45, which may be the same or similar as the positioning circuitry XS45 discussed with regard to FIG. 3.

In some implementations, the interface circuitry may connect the platform XT00 with near-field communication (NFC) circuitry XT40, which may include an NFC controller coupled with an antenna element and a processing device. The NFC circuitry XT40 may be configured to read electronic tags and/or connect with another NFC-enabled device.

The driver circuitry XT46 may include software and hardware elements that operate to control particular devices that are embedded in the platform XT00, attached to the platform XT00, or otherwise communicatively coupled with the platform XT00. The driver circuitry XT46 may include individual drivers allowing other components of the platform XT00 to interact or control various input/output (I/O) devices that may be present within, or connected to, the platform XT00. For example, driver circuitry XT46 may include a display driver to control and allow access to a display device, a touchscreen driver to control and allow access to a touchscreen interface of the platform XT00, sensor drivers to obtain sensor readings of sensors XT21 and control and allow access to sensors XT21, EMC drivers to obtain actuator positions of the EMCs XT22 and/or control and allow access to the EMCs XT22, a camera driver to control and allow access to an embedded image capture device, audio drivers to control and allow access to one or more audio devices.

The power management integrated circuitry (PMIC) XT25 (also referred to as "power management circuitry XT25") may manage power provided to various components of the platform XT00. In particular, with respect to the baseband circuitry XT10, the PMIC XT25 may control power-source selection, voltage scaling, battery charging, or DC-to-DC conversion. The PMIC XT25 may often be included when the platform XT00 is capable of being powered by a battery XT30, for example, when the device is included in a UE XQ01, XQ02, XR01.

In some embodiments, the PMIC XT25 may control, or otherwise be part of, various power saving mechanisms of the platform XT00. For example, if the platform XT00 is in an RRC_Connected state, where it is still connected to the RAN node as it expects to receive traffic shortly, then it may enter a state known as Discontinuous Reception Mode (DRX) after a period of inactivity. During this state, the platform XT00 may power down for brief intervals of time and thus save power. If there is no data traffic activity for an extended period of time, then the platform XT00 may transition off to an RRC_Idle state, where it disconnects from the network and does not perform operations such as channel quality feedback, handover, etc. The platform XT00 goes into a very low power state and it performs paging where again it periodically wakes up to listen to the network and then powers down again. The platform XT00 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery XT30 may power the platform XT00, although in some examples the platform XT00 may be mounted deployed in a fixed location, and may have a power supply coupled to an electrical grid. The battery XT30 may be a lithium ion battery, a metal-air battery, such as a zinc-air battery, an aluminum-air battery, a lithium-air battery, and the like. In some implementations, such as in V2X applications, the battery XT30 may be a typical lead-acid automotive battery.

In some implementations, the battery XT30 may be a "smart battery," which includes or is coupled with a Battery Management System (BMS) or battery monitoring integrated circuitry. The BMS may be included in the platform XT00 to track the state of charge (SoCh) of the battery XT30. The BMS may be used to monitor other parameters of the battery XT30 to provide failure predictions, such as the state of health (SoH) and the state of function (SoF) of the battery XT30. The BMS may communicate the information of the battery XT30 to the application circuitry XT05 or other components of the platform XT00. The BMS may also include an analog-to-digital (ADC) convertor that allows the application circuitry XT05 to directly monitor the voltage of the battery XT30 or the current flow from the battery XT30. The battery parameters may be used to determine actions that the platform XT00 may perform, such as transmission frequency, network operation, sensing frequency, and the like.

A power block, or other power supply coupled to an electrical grid may be coupled with the BMS to charge the battery XT30. In some examples, the power block XQ28 may be replaced with a wireless power receiver to obtain the power wirelessly, for example, through a loop antenna in the computer platform XT00. In these examples, a wireless battery charging circuit may be included in the BMS. The specific charging circuits chosen may depend on the size of the battery XT30, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform XT00 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I$^2$C interface, an SPI interface, point to point interfaces, and a power bus, among others.

Figure 5:
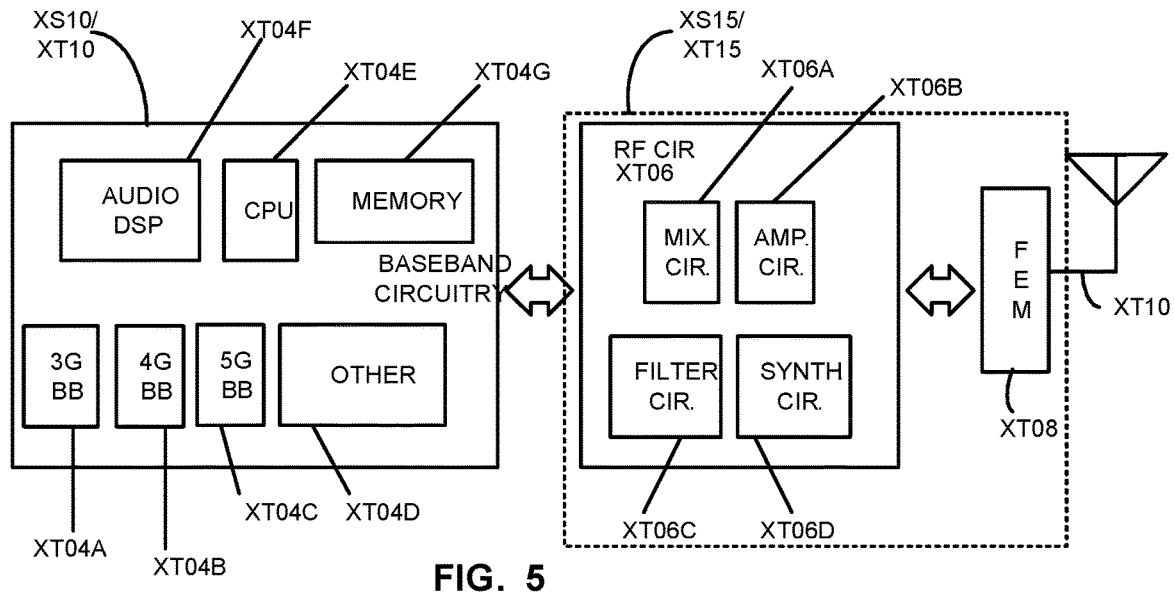
FIG. 5 illustrates example components of a device in accordance with some embodiments.

FIG. 5 illustrates example components of baseband circuitry XS10/XT10 and radio front end modules (RFEM) XS15/XT15 in accordance with some embodiments. As shown, the RFEM XS15/XT15 may include Radio Frequency (RF) circuitry XT06, front-end module (FEM) circuitry XT08, one or more antennas XT10 coupled together at least as shown.

The baseband circuitry XS10/XT10 may include circuitry such as, but not limited to, one or more single-core or multi-core processors. The baseband circuitry XS10/XT10 may include one or more baseband processors or control logic to process baseband signals received from a receive signal path of the RF circuitry XT06 and to generate baseband signals for a transmit signal path of the RF circuitry XT06. Baseband processing circuitry XS10/XT10 may interface with the application circuitry XS05/XT05 for generation and processing of the baseband signals and for controlling operations of the RF circuitry XT06. For example, in some embodiments, the baseband circuitry XS10/XT10 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XS10/XT10 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XS10/XT10 may include Fast-Fourier Transform (FFT), precoding, or constellation mapping/demapping functionality. In some embodiments, encoding/decoding circuitry of the baseband circuitry XS10/XT10 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XS10/XT10 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XS10/XT10 and the application circuitry XS05/XT05 may be implemented together such as, for example, on a system on a chip (SoC).

In some embodiments, the baseband circuitry XS10/XT10 may provide for communication compatible with one or more radio technologies. For example, in some embodiments, the baseband circuitry XS10/XT10 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XS10/XT10 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XS10/XT10. RF circuitry XT06 may also include a transmit signal path which may include circuitry to up-convert baseband signals provided by the baseband circuitry XS10/XT10 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XS10/XT10 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XS10/XT10 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XS10/XT10 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XS10/XT10 or the applications processor XS05/XT05 depending on the desired output frequency. In some embodiments, a divider control input (e.g., N) may be determined from a look-up table based on a channel indicated by the applications processor XS05/XT05.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

Processors of the application circuitry XS05/XT05 and processors of the baseband circuitry XS10/XT10 may be used to execute elements of one or more instances of a protocol stack. For example, processors of the baseband circuitry XS10/XT10, alone or in combination, may be used execute Layer 3, Layer 2, or Layer 1 functionality, while processors of the baseband circuitry XS10/XT10 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
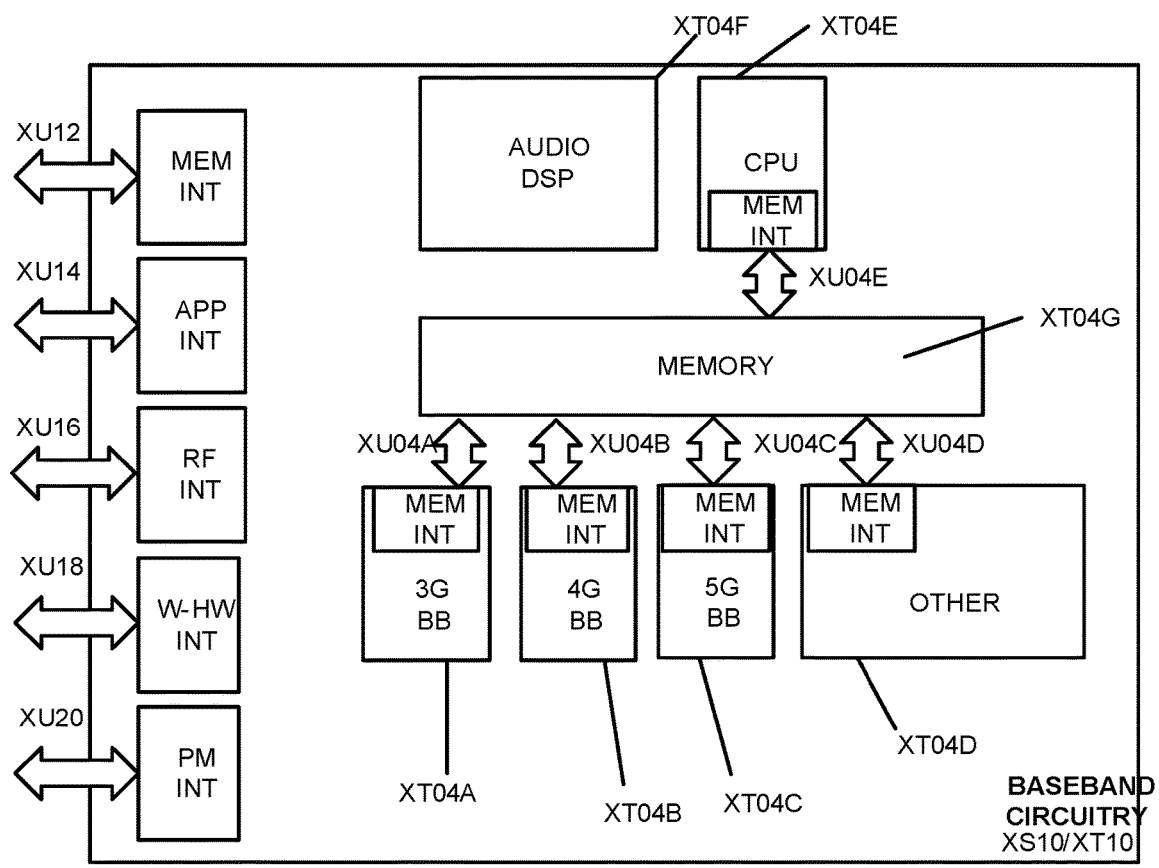
FIG. 6 illustrates example interfaces of baseband circuitry in accordance with some embodiments.

FIG. 6 illustrates example interfaces of baseband circuitry in accordance with some embodiments. As discussed above, the baseband circuitry XS10/XT10 of FIGS. XS-XT1 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XS10/XT10 may further include one or more interfaces to communicatively couple to other circuitries/devices, such as a memory interface XU12 (e.g., an interface to send/receive data to/from memory external to the baseband circuitry XS10/XT10), an application circuitry interface XU14 (e.g., an interface to send/receive data to/from the application circuitry XS05/XT05 of FIGS. XS-XT1), an RF circuitry interface XU16 (e.g., an interface to send/receive data to/from RF circuitry XT06 of FIG. 5), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMIC XT25.

Figure 7:
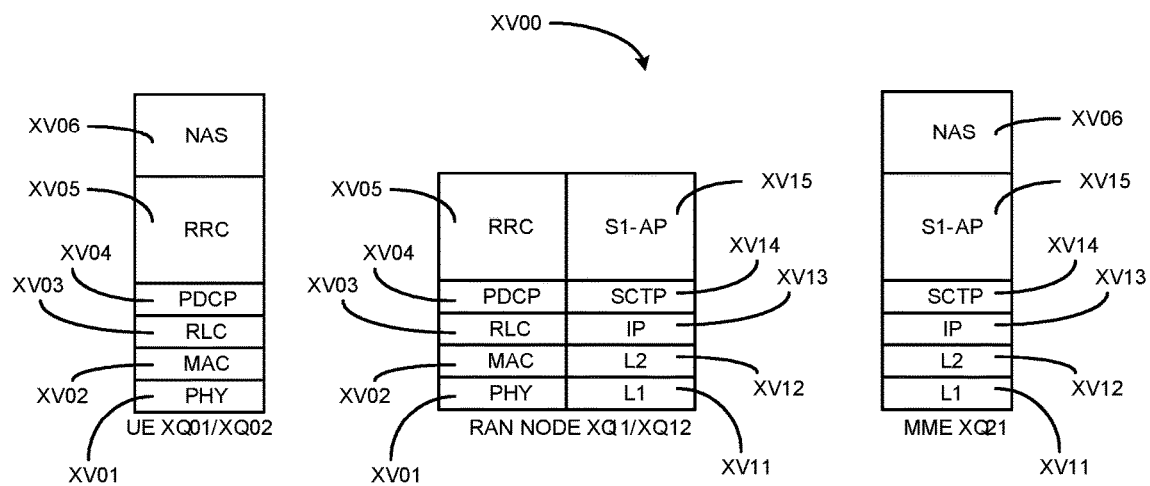
FIG. 7 illustrates a control plane protocol stack in accordance with some embodiments.

FIG. 7 is an illustration of a control plane protocol stack in accordance with some embodiments. In this embodiment, a control plane XV00 is shown as a communications protocol stack between the UE XQ01 (or alternatively, the UE XQ02), the RAN node XQ11 (or alternatively, the RAN node XQ12), and the MME XQ21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XQ01 and the RAN node XQ11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XQ01 and the MME XQ21. The NAS protocols XV06 support the mobility of the UE XQ01 and the session management procedures to establish and maintain IP connectivity between the UE XQ01 and the P-GW XQ23.

The S1 Application Protocol (S1-AP) layer XV15 may support the functions of the S1 interface and comprise Elementary Procedures (EPs). An EP is a unit of interaction between the RAN node XQ11 and the CN XQ20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XQ11 and the MME XQ21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XQ11 and the MME XQ21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 8:
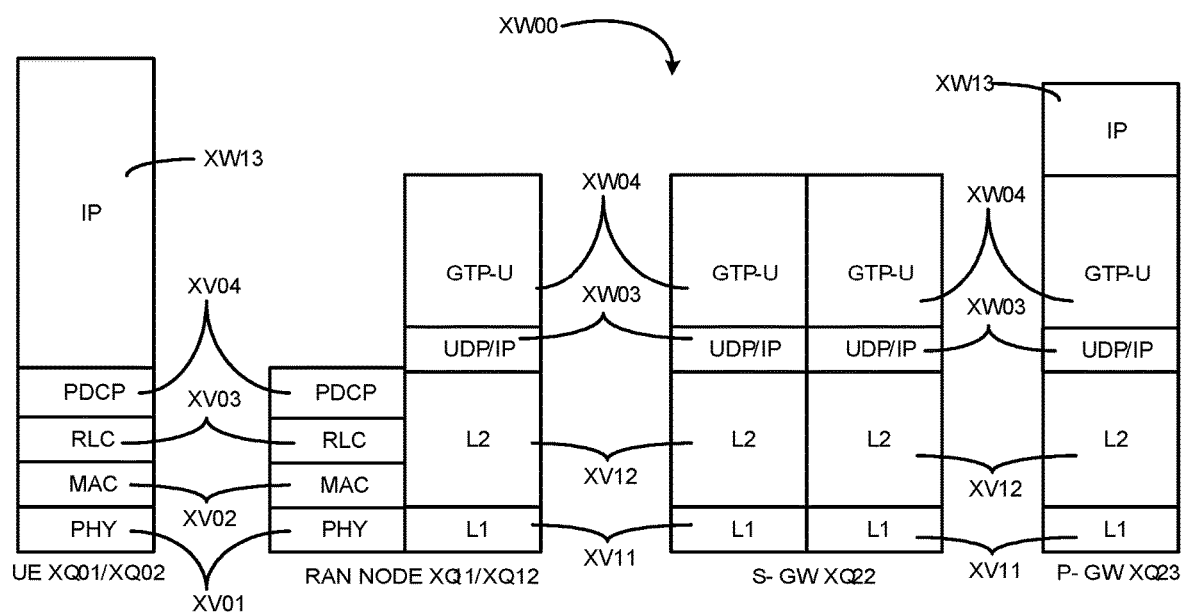
FIG. 8 illustrates a user plane protocol stack in accordance with some embodiments.

FIG. 8 is an illustration of a user plane protocol stack in accordance with some embodiments. In this embodiment, a user plane XW00 is shown as a communications protocol stack between the UE XQ01 (or alternatively, the UE XQ02), the RAN node XQ11 (or alternatively, the RAN node XQ12), the S-GW XQ22, and the P-GW XQ23. The user plane XW00 may utilize at least some of the same protocol layers as the control plane XV00. For example, the UE XQ01 and the RAN node XQ11 may utilize a Uu interface (e.g., an LTE-Uu interface) to exchange user plane data via a protocol stack comprising the PHY layer XV01, the MAC layer XV02, the RLC layer XV03, the PDCP layer XV04.

The General Packet Radio Service (GPRS) Tunneling Protocol for the user plane (GTP-U) layer XW04 may be used for carrying user data within the GPRS core network and between the radio access network and the core network. The user data transported can be packets in any of IPv4, IPv6, or PPP formats, for example. The UDP and IP security (UDP/IP) layer XW03 may provide checksums for data integrity, port numbers for addressing different functions at the source and destination, and encryption and authentication on the selected data flows. The RAN node XQ11 and the S-GW XQ22 may utilize an S1-U interface to exchange user plane data via a protocol stack comprising the L1 layer XV11, the L2 layer XV12, the UDP/IP layer XW03, and the GTP-U layer XW04. The S-GW XQ22 and the P-GW XQ23 may utilize an S5/S8a interface to exchange user plane data via a protocol stack comprising the L1 layer XV11, the L2 layer XV12, the UDP/IP layer XW03, and the GTP-U layer XW04. As discussed above with respect to FIG. 7, NAS protocols support the mobility of the UE XQ01 and the session management procedures to establish and maintain IP connectivity between the UE XQ01 and the P-GW XQ23.

Figure 9:
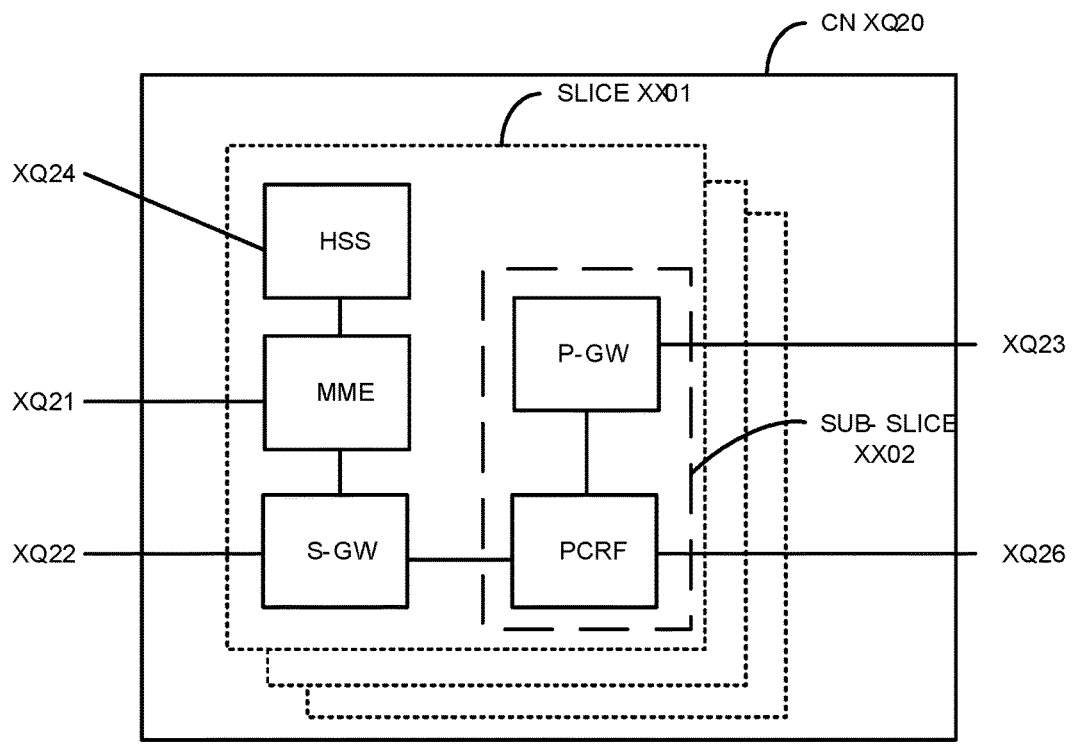
FIG. 9 illustrates components of a core network in accordance with some embodiments.

FIG. 9 illustrates components of a core network in accordance with some embodiments. The components of the CN XQ20 may be implemented in one physical node or separate physical nodes including components to read and execute instructions from a machine-readable or computer-readable medium (e.g., a non-transitory machine-readable storage medium). In embodiments, the components of CN XR20 may be implemented in a same or similar manner as discussed herein with regard to the components of CN XQ20. In some embodiments, Network Functions Virtualization (NFV) is utilized to virtualize any or all of the above described network node functions via executable instructions stored in one or more computer-readable storage mediums (described in further detail below). A logical instantiation of the CN XQ20 may be referred to as a network slice XX01, and individual logical instantiations of the CN XQ20 may provide specific network capabilities and network characteristics. A logical instantiation of a portion of the CN XQ20 may be referred to as a network sub-slice XX02 (e.g., the network sub-slice XX02 is shown to include the PGW XQ23 and the PCRF XQ26).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see e.g., FIG. 2), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
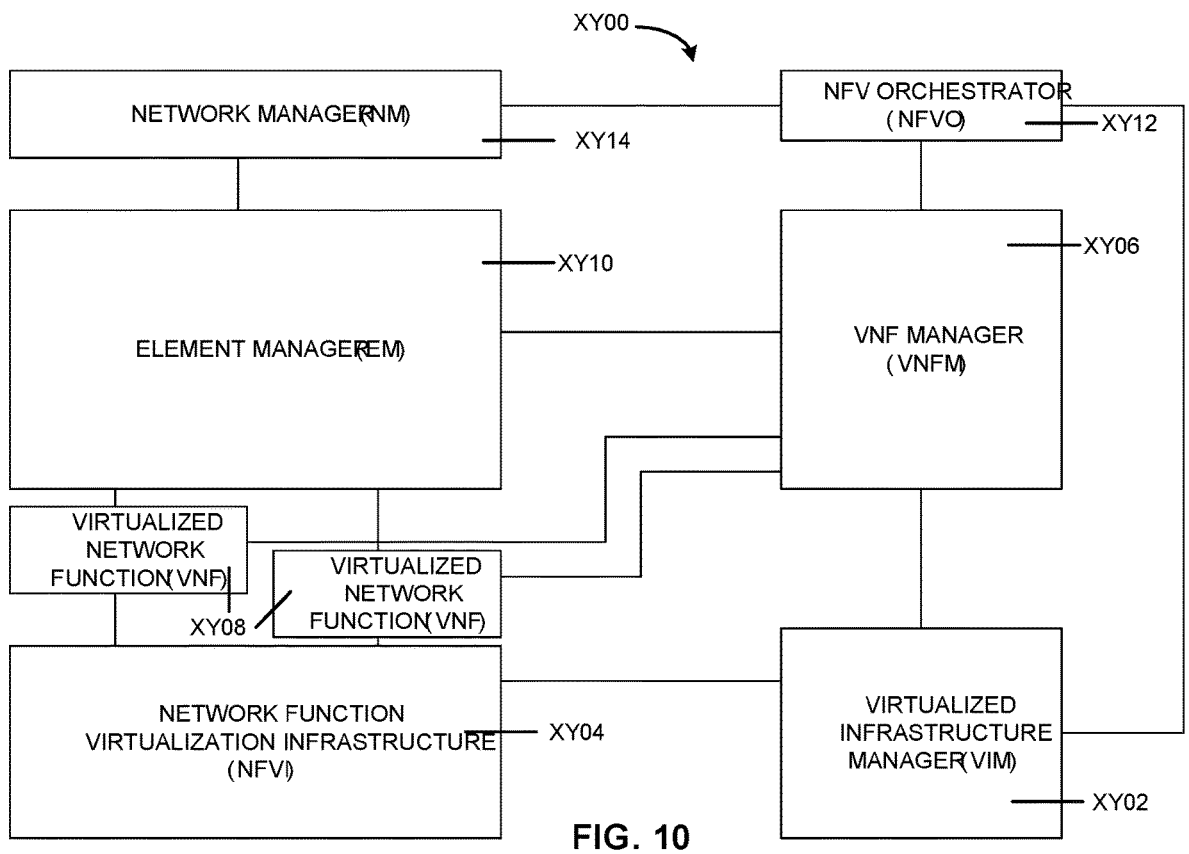
FIG. 10 illustrates components, according to some example embodiments, of a system to support NFV.

FIG. 10 is a block diagram illustrating components, according to some example embodiments, of a system XY00 to support NFV. The system XY00 is illustrated as including a virtualized infrastructure manager (VIM) XY02, a network function virtualization infrastructure (NFVI) XY04, a VNF manager (VNFM) XY06, virtualized network functions (VNFs) XY08, an element manager (EM) XY10, an NFV Orchestrator (NFVO) XY12, and a network manager (NM) XY14.

The VIM XY02 manages the resources of the NFVI XY04. The NFVI XY04 can include physical or virtual resources and applications (including hypervisors) used to execute the system XY00. The VIM XY02 may manage the life cycle of virtual resources with the NFVI XY04 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM XY06 may manage the VNFs XY08. The VNFs XY08 may be used to execute EPC components/functions. The VNFM XY06 may manage the life cycle of the VNFs XY08 and track performance, fault and security of the virtual aspects of VNFs XY08. The EM XY10 may track the performance, fault and security of the functional aspects of VNFs XY08. The tracking data from the VNFM XY06 and the EM XY10 may comprise, for example, performance measurement (PM) data used by the VIM XY02 or the NFVI XY04. Both the VNFM XY06 and the EM XY10 can scale up/down the quantity of VNFs of the system XY00.

The NFVO XY12 may coordinate, authorize, release and engage resources of the NFVI XY04 in order to provide the requested service (e.g., to execute an EPC function, component, or slice). The NM XY14 may provide a package of end-user functions with the responsibility for the management of a network, which may include network elements with VNFs, non-virtualized network functions, or both (management of the VNFs may occur via the EM XY10).

Figure 11:
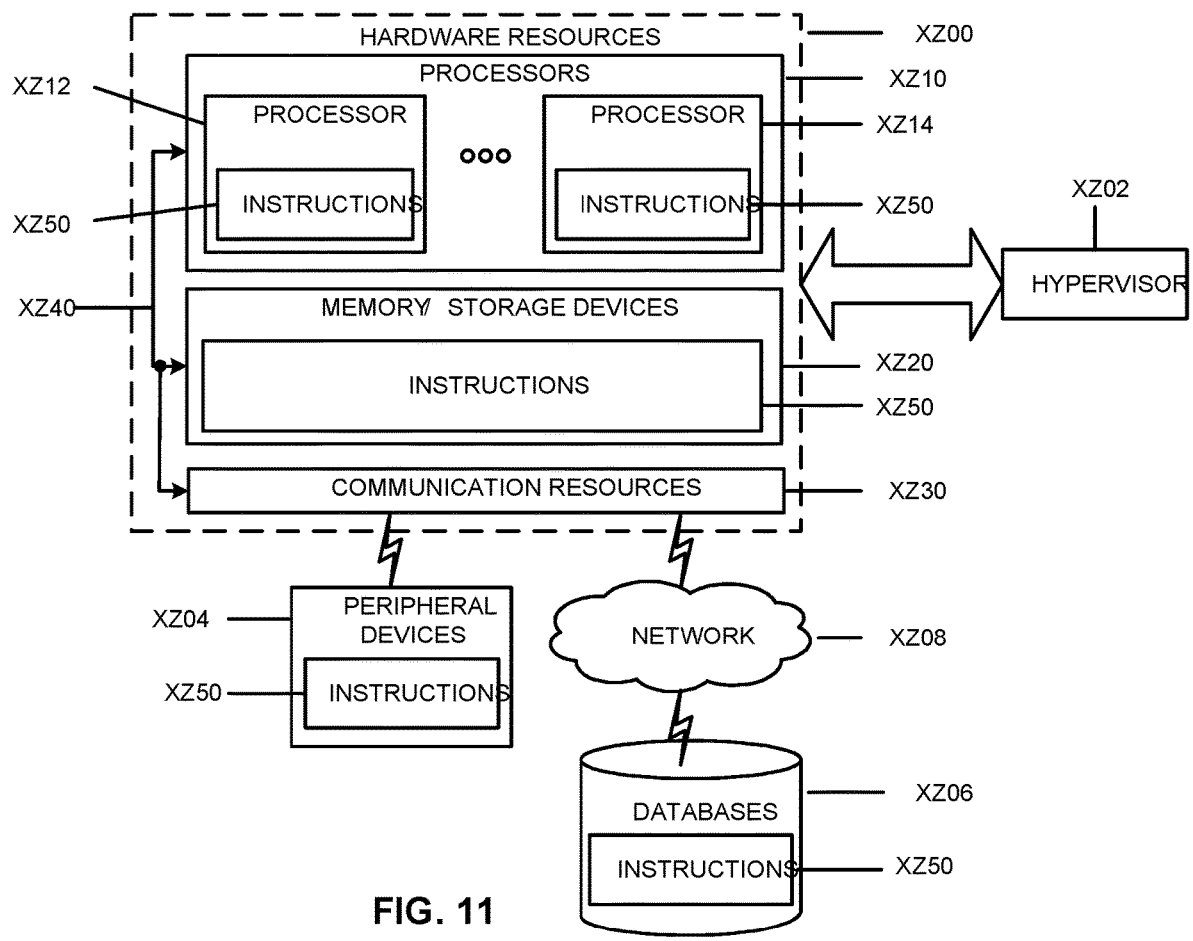
FIG. 11 illustrates components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor XZ02 may be executed to provide an execution environment for one or more network slices/sub-slices to utilize the hardware resources XZ00. A "virtualized resource" may refer to compute, storage, and/or network resources provided by virtualization infrastructure to an application, device, system, etc.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 may include a method of support of advanced UE minimum processing times for PDSCH processing and PUSCH preparation in NR, wherein the advanced UE minimum processing times for PDSCH processing and PUSCH preparation are smaller than or equal to the corresponding UE minimum processing times following Capability 1, comprising: indicating or causing to indicate a capability from the UE to the network in the form of capability reporting for support of Capability 2 processing times; multiplexing or causing to multiplex scheduling instances with Capabilities 1 or 2 within a serving cell; and applying or causing to apply a relaxation to the minimum UE processing times, N1, indicating time between end of PDSCH to earliest start of corresponding HARQ-ACK feedback transmission when the PDSCH may have specific durations and/or mapping types or may have time-domain overlaps with the scheduling PDCCH.

Example 2 may include the method of example 1 and/or some other examples herein, wherein the capability is indicated by the UE for each SCS value.

Example 3 may include the method of example 1 and/or some other examples herein, wherein the capability is indicated by the UE for each SCS value and the capability includes information on the maximum number of DL or UL component carriers (CCs) respectively that may be configured to the UE with Capability 2 processing times.

Example 4 may include the method of example 1 and/or some other examples herein, wherein the capability is limited to single-CC operation only and not applicable if the UE is configured with CA. Example 5 may include the method of example 1 and/or some other examples herein, wherein Capability 2-based timing is expected for PDSCH processing if the PDSCH is scheduled with no more than a specified number of PRBs for the corresponding subcarrier spacing (SCS).

Example 6 may include the method of example 1 and/or some other examples herein, wherein the capability is limited to a subset of single DL/UL CCs, respectively, such that the UE is configured, for each of the subset of DL and/or UL CCs, respectively, whether Capability 2-based timing is enabled. For all other configured CCs, Capability 1-based timing applies.

Example 7 may include the method of example 1 and/or some other examples herein, wherein the UE does not expect to dynamically switch between Capabilities 1 and 2 for a configured CC.

Example 8 may include the method of example 1 and/or some other examples herein, wherein the UE may drop the processing of one or more of PDSCHs that may be scheduled to follow Capability 1 such that they are scheduled within a window 'W_N1' before the start of a PDSCH that is scheduled to follow Capability 2.

Example 9 may include the method of example 8 and/or some other examples herein, wherein W_N1 is from {1, 2, . . . , N1_cap1} where N1_cap1 corresponds to the N1 value defined for the given SCS value for Capability 1.

Example 10 may include the method of example 8 and/or some other examples herein, wherein W_N1 is from {1, 2, . . . , N1'_cap1} where N1'_cap1=N1_cap1+m_N1, where m_N1 is specified with a value of 1, 2, 3, 4, or 5, and N1_cap1 corresponds to the N1 value defined for the given SCS value for Capability 1.

Example 11 may include the method of example 1 and/or some other examples herein, wherein the UE may drop the processing of one or more of PUSCH transmissions that may be scheduled to follow Capability 1 such that they are scheduled within a window 'W_N2' before the start of a PDCCH that carries an UL grant to schedule a PUSCH following Capability 2.

Example 12 may include the method of example 11 and/or some other examples herein, wherein W_N2 is from {1, 2, . . . , N2_cap1} where N2_cap1 corresponds to the N2 value defined for the given SCS value for Capability 1.

Example 13 may include the method of example 11 and/or some other examples herein, wherein W_N2 is from {1, 2, . . . , N2'_cap1} where N2'_cap1=N2_cap1+m_N2, and m_N2=1, and N2_cap1 corresponds to the N2 value defined for the given SCS value for Capability 1.

Example 14 may include the method of example 1 and/or some other examples herein, wherein for PDSCH with mapping type A and with last PDSCH symbol ending in symbol T of a slot, where i<7, for Capability 2 processing times, 'd' symbols are added to the N1 value where d=(7−i) and where N1 is defined as for PDSCH mapping type A with >=7 symbols.

Example 15 may include the method of example 1 and/or some other examples herein, wherein for PDSCH with mapping type B and 7-symbol duration, for Capability 2 processing times, 'd' symbols are added to the N1 value, where N1 value is defined as for PDSCH mapping type A with >=7 symbols and d=0.

Example 16 may include the method of example 1 and/or some other examples herein, wherein PDSCH with mapping type B and 4-symbol duration, for Capability 2 processing times, 'd' symbols are added to the N1 value, where N1 value is defined as for PDSCH mapping type A with >=7 symbols and d is the number of overlapping symbols of the scheduling PDCCH and the scheduled PDSCH.

Example 17 may include the method of example 1 and/or some other examples herein, wherein for PDSCH with mapping type B and 2-symbol duration, for Capability 2 processing times 'd' symbols are added to the N1 value, where N1 value is defined as for PDSCH mapping type A with >=7 symbols and 'd' is defined as: if the scheduling PDCCH was in a 3-symbol CORESET and the scheduling PDCCH and scheduled PDSCH have same starting symbol, d=CORESET_duration=3 symbol, where CORESET_duration corresponds to the duration of the CORESET that is used to map the scheduling PDCCH, and otherwise 'd' is the number of overlapping symbols of the scheduling PDCCH and the scheduled PDSCH.

Example 18 may include an apparatus configured to support advanced UE minimum processing times for PDSCH processing and PUSCH preparation in NR, wherein the advanced UE minimum processing times for PDSCH processing and PUSCH preparation are smaller than or equal to the corresponding UE minimum processing times following Capability 1. The apparatus comprises a memory configured to store one or more instructions, and one or more processors operably coupled to the memory, and, upon executing the one or more instructions. The one or more processors is/are configured to: indicate or cause to indicate a capability from the UE to the network in the form of capability reporting for support of Capability 2 processing times; multiplex or cause to multiplex scheduling instances with Capabilities 1 or 2 within a serving cell; and apply or cause to apply a relaxation to the minimum UE processing times, N1, indicating time between end of PDSCH to earliest start of corresponding HARQ-ACK feedback transmission when the PDSCH may have specific durations and/or mapping types or may have time-domain overlaps with the scheduling PDCCH.

Example 19 may include an apparatus of example 18 and/or any other examples, wherein the capability is indicated by the UE for each subcarrier spacing (SCS) value.

Example 20 may include an apparatus of Example 18 and/or any other examples, wherein the capability is indicated by the UE for each SCS value and the capability includes information on the maximum number of DL or UL component carriers (CCs) respectively that may be configured to the UE with Capability 2 processing times.

Example 21 may include an apparatus of Example 18 and/or any other examples, wherein the capability is limited to single-CC operation only and is not applicable if the UE is configured with carrier aggregation (CA).

Example 22 may include an apparatus of Example 18 and/or any other examples, wherein the capability is limited to a single downlink/uplink (DL/UL) CC and the UE is configured with a single DL and/or UL CC for which Capability 2 applies, and wherein for all other configured CCs, Capability 1 applies.

Example 23 may include an apparatus of Example 18 and/or any other examples, wherein the UE is configured to drop the processing of one or more of PDSCHs that are scheduled to follow Capability 1 such that the one or more PDSCHs are scheduled within a window (W_N1) before the start of a PDSCH that is scheduled to follow Capability 2.

Example 24 may include a non-transitory computer-readable media comprising instructions to cause an electronic device, upon execution of the instructions by one or more processors of the electronic device, to perform one or more elements of a method. The method comprises indicating or causing to indicate a capability from the UE to the network in the form of capability reporting for support of Capability 2 processing times; multiplexing or causing to multiplex scheduling instances with Capabilities 1 or 2 within a serving cell; and applying or causing to apply a relaxation to the minimum UE processing times, N1, indicating time between end of PDSCH to earliest start of corresponding hybrid automatic repeat request-acknowledge (HARQ-ACK) feedback transmission when the PDSCH has specific durations and/or mapping types or has time-domain overlaps with the scheduling physical downlink control channel (PDCCH).

Example 25 may include an apparatus comprising means to perform one or more elements of a method described in or related to any of examples 1-17, or any other method or process described herein.

Example 26 may include one or more non-transitory computer-readable media comprising instructions to cause an electronic device, upon execution of the instructions by one or more processors of the electronic device, to perform one or more elements of a method described in or related to any of examples 1-17, or any other method or process described herein.

Example 27 may include an apparatus comprising logic, modules, or circuitry to perform one or more elements of a method described in or related to any of examples 1-17, or any other method or process described herein.

Example 28 may include a method, technique, or process as described in or related to any of examples 1-17, or portions or parts thereof.

Example 29 may include an apparatus comprising: one or more processors and one or more computer readable media comprising instructions that, when executed by the one or more processors, cause the one or more processors to perform the method, techniques, or process as described in or related to any of examples 1-17, or portions thereof.

Example 30 may include a signal as described in or related to any of examples 1-17, or portions or parts thereof.

Example 31 may include a signal in a wireless network as shown and described herein.

Example 32 may include a method of communicating in a wireless network as shown and described herein.

Example 33 may include a system for providing wireless communication as shown and described herein.

Example 34 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Various illustrative logics, logical blocks, modules, and circuits described in connection with aspects disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A method of supporting advanced user equipment (UE) minimum processing times for physical downlink shared channel (PDSCH) processing and physical uplink shared channel (PUSCH) preparation in new radio (NR), wherein the advanced UE minimum processing times for PDSCH processing and PUSCH preparation are smaller than or equal to the corresponding UE minimum processing times following Capability 1, comprising:
   indicating or causing to indicate a capability from the UE to the network in the form of capability reporting for support of Capability 2 processing times;
   multiplexing or causing to multiplex scheduling instances with Capabilities 1 or 2 within a serving cell; and
   applying or causing to apply a relaxation to the minimum UE processing times for PDSCH processing, N1, indicating time between end of PDSCH to earliest start of corresponding hybrid automatic repeat request-acknowledge (HARQ-ACK) feedback transmission when the PDSCH has specific durations and/or mapping types or has time-domain overlaps with the scheduling physical downlink control channel (PDCCH).

2. The method of claim 1, wherein the capability is indicated by the UE for each subcarrier spacing (SCS) value.

3. The method of claim 1, wherein the capability is indicated by the UE for each SCS value and the capability includes information on the maximum number of DL or UL component carriers (CCs) respectively that may be configured to the UE with Capability 2 processing times.

4. The method of claim 1, wherein the capability is limited to single-CC operation only and is not applicable if the UE is configured with carrier aggregation (CA).

5. The method of claim 4, wherein Capability 2-based timing is expected for PDSCH processing if the PDSCH is scheduled with no more than a specified number of PRBs for the corresponding subcarrier spacing (SCS).

6. The method of claim 1, wherein the capability is limited to a subset of downlink/uplink (DL/UL) CC, respectively, such that the UE is configured, for each of the subset of DL or UL CCs, respectively, whether Capability 2-based timing is enabled, and wherein for all other configured CCs, Capability 1-based timing applies.

7. The method of claim 1, wherein the UE is configured to drop the processing of one or more of PDSCHs that are scheduled to follow Capability 1 such that the one or more PDSCHs are scheduled within a window (W_N1) before the start of a PDSCH that is scheduled to follow Capability 2.

8. The method of claim 7, wherein W_N1 is N1_cap1 where N1_cap1 corresponds to the N1 value defined for the given SCS value for Capability 1.

9. The method of claim 1, wherein the UE is configured to drop the processing of one or more of PUSCH transmissions that are scheduled to follow Capability 1 such that they are scheduled within a window (W_N2) before a start of a PDCCH that carries an UL grant to schedule a PUSCH following Capability 2.

10. The method of claim 9, wherein W_N2 is N2_cap1 where N2_cap1 corresponds to the N2 value defined for the given SCS value for Capability 1.

11. The method of claim 1, wherein for PDSCH with mapping type A and with last PDSCH symbol ending in symbol 'i' of a slot, where i<7, for Capability 2 processing times, 'd' symbols are added to the N1 value where d=(7−i) and where N1 is defined as for PDSCH mapping type A with >=7 symbols.

12. The method of claim 1, wherein for PDSCH with mapping type B and 7-symbol duration, for Capability 2 processing times, 'd' symbols are added to the N1 value, where N1 value is defined as for PDSCH mapping type A with >=7 symbols and d=0.

13. The method of claim 1, wherein PDSCH with mapping type B and 4-symbol duration, for Capability 2 processing times, 'd' symbols are added to the N1 value, where N1 value is defined as for PDSCH mapping type A with >=7 symbols and d is the number of overlapping symbols of the scheduling PDCCH and the scheduled PDSCH.

14. The method of claim 1, wherein for PDSCH with mapping type B and 2-symbol duration, for Capability 2 processing times, 'd' symbols are added to the N1 value, where N1 value is defined as for PDSCH mapping type A with >=7 symbols and 'd' is defined as:
   if the scheduling PDCCH was in a 3-symbol CORESET and the scheduling PDCCH and scheduled PDSCH have same starting symbol, d=CORESET_duration=3 symbol, where CORESET_duration corresponds to the duration of the CORESET that is used to map the scheduling PDCCH, and otherwise, 'd' is the number of overlapping symbols of the scheduling PDCCH and the scheduled PDSCH.

15. An apparatus configured to support advanced UE minimum processing times for PDSCH processing and PUSCH preparation in NR, wherein the advanced UE minimum processing times for PDSCH processing and PUSCH preparation are smaller than or equal to the corresponding UE minimum processing times following Capability 1, comprising:
   a memory configured to store one or more instructions; and
   one or more processors operably coupled to the memory, and, upon executing the one or more instructions, is configured to:
   indicate or cause to indicate a capability from the UE to the network in the form of capability reporting for support of Capability 2 processing times;
   multiplex or cause to multiplex scheduling instances with Capabilities 1 or 2 within a serving cell; and
   apply or cause to apply a relaxation to the minimum UE processing times, N1, indicating time between end of PDSCH to earliest start of corresponding HARQ-ACK feedback transmission when the PDSCH may have specific durations and/or mapping types or may have time-domain overlaps with the scheduling PDCCH.

16. The apparatus of claim 15, wherein the capability is indicated by the UE for each subcarrier spacing (SCS) value.

17. The apparatus of claim 15, wherein the capability is indicated by the UE for each SCS value and the capability includes information on the maximum number of DL or UL component carriers (CCs) respectively that may be configured to the UE with Capability 2 processing times.

18. The apparatus of claim 15, wherein the capability is limited to single-CC operation only and is not applicable if the UE is configured with carrier aggregation (CA).

19. The apparatus of claim 15, wherein the capability is limited to a single downlink/uplink (DL/UL) CC and the UE is configured with a single DL and/or UL CC for which Capability 2 applies, and wherein for all other configured CCs, Capability 1 applies.

20. The apparatus of claim 15, wherein the UE is configured to drop the processing of one or more of PDSCHs that are scheduled to follow Capability 1 such that the one or more PDSCHs are scheduled within a window (W_N1) before the start of a PDSCH that is scheduled to follow Capability 2.

21. A non-transitory computer-readable media comprising instructions to cause an electronic device, upon execution of the instructions by one or more processors of the electronic device, to perform one or more elements of a method, comprising:
   indicating or causing to indicate a capability from the UE to the network in the form of capability reporting for support of Capability 2 processing times;
   multiplexing or causing to multiplex scheduling instances with Capabilities 1 or 2 within a serving cell; and
   applying or causing to apply a relaxation to the minimum UE processing times, N1, indicating time between end of PDSCH to earliest start of corresponding hybrid automatic repeat request-acknowledge (HARQ-ACK) feedback transmission when the PDSCH has specific durations and/or mapping types or has time-domain overlaps with the scheduling physical downlink control channel (PDCCH).

* * * * *